(12) United States Patent
Pierce et al.

(10) Patent No.: US 8,305,593 B2
(45) Date of Patent: Nov. 6, 2012

(54) PREDICTIVE USER INTERFACE MIMICS FOR FINISHING

(75) Inventors: Thomas L. Pierce, Rochester, NY (US); Andrew J. Welsh, Rochester, NY (US); Kara Allison Rozen, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 938 days.

(21) Appl. No.: 12/327,491

(22) Filed: Dec. 3, 2008

(65) Prior Publication Data

US 2010/0134825 A1 Jun. 3, 2010

(51) Int. Cl.
*G06F 3/12* (2006.01)
(52) U.S. Cl. ....... 358/1.13; 347/14; 358/1.12; 358/1.14; 358/1.2; 358/449; 399/407; 399/410; 399/81; 399/82
(58) Field of Classification Search ................. 358/1.13, 358/1.12, 1.14, 1.15, 1.2, 1.9, 449; 347/14; 355/40; 399/407, 410, 81, 82; 400/76; 700/83; 715/764
See application file for complete search history.

(56) References Cited

U.S. PATENT DOCUMENTS

| | | | |
|---|---|---|---|
| 5,799,219 A * | 8/1998 | Moghadam et al. | 396/319 |
| 6,104,470 A * | 8/2000 | Streefkerk et al. | 355/40 |
| 6,614,454 B1 * | 9/2003 | Livingston | 715/781 |
| 6,697,091 B1 | 2/2004 | Rzepkowski et al. | |
| 6,830,390 B1 * | 12/2004 | Hayashi | 400/76 |
| 6,850,259 B1 | 2/2005 | Rzepkowski et al. | |
| 6,975,417 B1 * | 12/2005 | Hilpl et al. | 358/1.15 |
| 7,065,716 B1 | 6/2006 | Rzepkowski et al. | |
| 2003/0160977 A1 * | 8/2003 | Nishikawa et al. | 358/1.2 |
| 2004/0040034 A1 * | 2/2004 | Sullivan et al. | 725/25 |
| 2006/0033953 A1 * | 2/2006 | Asai | 358/1.15 |
| 2006/0058900 A1 * | 3/2006 | Johanson et al. | 700/83 |
| 2006/0104687 A1 | 5/2006 | Campbell et al. | |
| 2006/0215181 A1 * | 9/2006 | Sugimoto et al. | 358/1.1 |
| 2007/0143696 A1 * | 6/2007 | McComber | 715/764 |
| 2007/0146784 A1 * | 6/2007 | Perry et al. | 358/1.16 |

* cited by examiner

*Primary Examiner* — King Poon
*Assistant Examiner* — David S Cammack
(74) *Attorney, Agent, or Firm* — Hoffman & Baron, LLP

(57) ABSTRACT

According to aspects illustrated herein, there is provided a user interface system for preparing an output document of a digital printing device having a user interface, a set of output options for the output document. The user interface enables selection of at least one output option from the set of output options. The system further provides a display device operatively connected to the user interface and configured to display at least one user interface mimic for the output document, with the at least one user interface mimic providing a graphical representation of the output document based on selection of the output options. After displaying the at least one user interface mimic, the user interface allows users to modify the output options prior to printing the output document. Then, the system updates the display of the at least one user interface mimic, based on modifications to the output options, prior to printing the output document.

4 Claims, 12 Drawing Sheets

PREDICTIVE USER INTERFACE MIMICS FOR FINISHING

TECHNICAL FIELD

This disclosure generally relates to user interfaces for copiers. It more particularly concerns user interface mimics which graphically represent output documents for selecting finishing options for a copier.

BACKGROUND

Systems for digital printing include a variety of marking technologies, such as Electrophotographic, Liquid Ink Jet, Solid Ink Jet, which are well-known and commonly used for copying or printing documents. Many of these marking technologies provide user interfaces that allow for the selection of output options, such as finishing options, image modification, watermarks, edge erase, and image shift. When output options are selected with current user interfaces, it may be difficult to predict the output, resulting in multiple trials and errors before users achieve a desired output.

When the printing includes placing multiple output images on one sheet, such as on multiple-up and image repeat copy jobs, it may become difficult to predict the output because the original orientation of the individual images may be different than the output orientation of the aggregate output image. Previous user interfaces have been unable to predict, for example, the finishing location of staples to accommodate the intricacies of printing jobs with multiple-up and repeating images. One reason for the unpredictability of the output is that a user must choose both the page orientation and the number of staples using the user interface. Then, based on the information about page orientation, the number of staples, and the selection of short edge feed (SEF) or long edge feed (LEF), the paper output orientation is determined. If the wrong selection is made for any of the above the staple finishing option may be placed in the wrong location, for example, the staple would be placed on the upper-right corner instead of the upper-left corner.

While prior user interface systems have been successful in allowing the selection of various finishing options, there exists a need for an improved user interface system that provides user interface mimics to assist in predicting the output prior to actually printing on the digital printing device.

SUMMARY

According to aspects illustrated herein, there is provided a user interface system for preparing an output document of a digital printing device having a user interface, a set of output options for the output document. The user interface enables selection of at least one output option from the set of output options. The system further provides a display device operatively connected to the user interface and configured to display at least one user interface mimic for the output document, with the at least one user interface mimic providing a graphical representation of the output document based on selection of the output options. After displaying the at least one user interface mimic, the user interface allows users to modify the output options prior to printing the output document. Then, the system updates the display of the at least one user interface mimic, based on modifications to the output options, prior to printing the output document.

According to other aspects illustrated herein, there is provided a method for predicting an output document of a digital printing device using at least one user interface mimic. The method provides users with a set of output options for the output document and allows users to select at least one output option from the set of output options. The method displays the at least one user interface mimic for the output document, with the at least one user interface mimic providing a graphical representation of the output document, based on the selection of the output options. The method further allows users to modify the output options, prior to printing the output document and update the at least one user interface mimic based on the modified output options to generate an at least one updated user interface mimic, prior to printing the output document. Then, the method displays the at least one updated user interface mimic, prior to printing the output document.

Additional features and advantages will be readily apparent from the following detailed description, the accompanying drawings and the claims. It is to be understood, however, that the drawings are designed as an illustration only and not as a definition of the limits of the disclosure.

BRIEF DESCRIPTION OF THE DRAWINGS

Like reference symbols in the various drawings indicate like elements.

DETAILED DESCRIPTION

Figure 1:
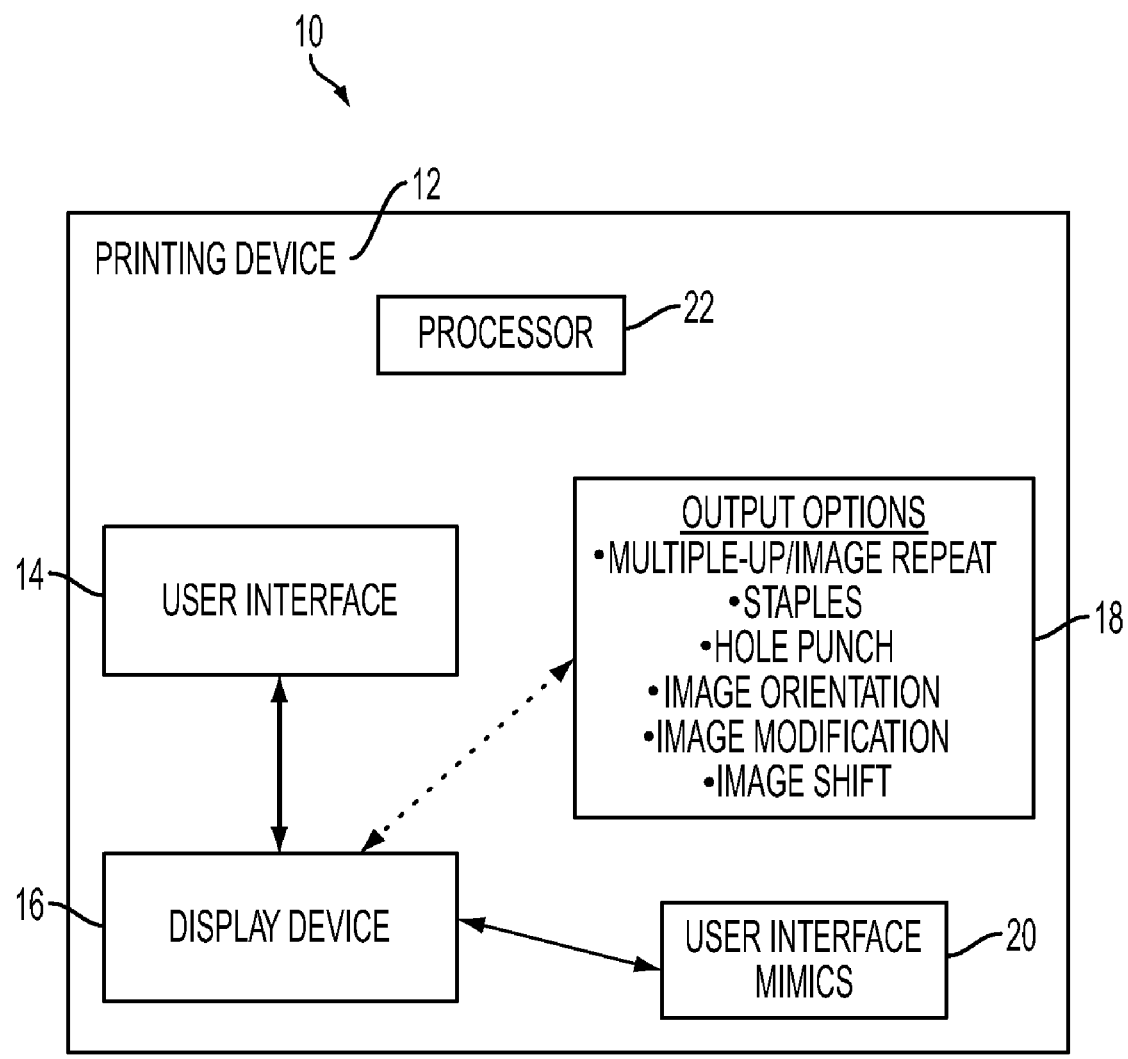
FIG. 1 provides an example user interface system for preparing an output document of a digital printing device.

Referring to FIG. 1, a system 10 is disclosed including a printing device 12, a user interface 14, and a display device 16. The user interface 14 and display device 16 are operatively connected and provide a unique presentation for graphically displaying the output document orientation, and the selected output attributes.

As used herein, the phrase "printing device" encompasses any apparatus, such as a digital copier, a bookmaking machine, a facsimile machine, and a multi-function machine, which performs a printing outputting function for any purpose.

As used herein, the phrase "user interface" encompasses the displays and the buttons that provides a means for users to interact with the system. The interaction includes input that allows users to manipulate the system and output that allows the system to produce the effects of the user's manipulation. The user interface may be associated with the screen on a digital copier or a general computer. Examples include key pads, at least one mouse, buttons, and touch screens.

As used herein the phrase "display device" encompasses an output device for presentation of information for visual reception and may be acquired, stored, or transmitted in various forms. The output device may be provided over one or multiple components (such as multiple screens). Examples include computer monitors and televisions sets.

As used herein the phrase "output options" encompasses options provided by a printing device to include an output document. Examples include finishing options, such as stapling, hole punching, and folding; image orientation; image location, such as one-sided, two-sided, or booklet orientation; multiple-up or image repeat; paper size; paper orientation, such as landscape or portrait; image modification, such as annotations, page numbers; dates, water marks; edge erase, such as removal of the top, bottom, and/or side edges; and image shift, such as shifting the images up, down, left, and right.

As used herein the phrase "user interface mimic" encompasses any output from a user interface 14 that graphically depicts an output document having one or more output options associated therewith.

More specifically, the system 10 of FIG. 1 further includes a set of output options 18 and a user interface mimic 20. The system 10 provides users with the ability to select at least one of the output options 18 from the set of output options 18 using the user interface 14. The output options 18 include, but are not limited to the following: finishing options, such as stapling, hole punching, and folding; image orientation; image location, such as one-sided, two-sided, or booklet orientation; multiple-up or image repeat; paper size; paper orientation, such as landscape or portrait; image modification, such as annotations, page numbers, dates, and water marks; edge erase, such as removal of the top, bottom, and/or side edges; and image shift, such as shifting the images up, down, left, and right. Preferably, the output options 18 are presented to a user on the display device 16.

The display device 16 is configured to graphically depict at least one user interface mimic 20, which is a graphical representation of an output document based on selection of the output options 18. For example, the user interface mimic 20 may graphically represent a paper of selected size with selected orientation and with the number and location of staples being shown.

The user interface 14 provides users with the option of modifying the output options 18 prior to printing the output document. When one or more of the output options 18 are modified, the user interface 14 updates the user interface mimic 20 based on the modifications to the output options 18, prior to printing the output document. The updated user interface mimic 20 is displayed on the display device 16, prior to printing the output document.

Within the printing device 12 is a processor 22 or other unit known to those skilled in the art, which is operatively connected to the user interface 14, the display device 16, the output options 18, and the user interface mimic 20. The processor 22 functionality includes updating the user interface 14, the display device 16, the output options 18, and the user interface mimic 20 and controlling the communications therebetween. Some of the output options 18 may be automatically generated, e.g., by default settings, physical constraints of the system 10, and/or options 18 which may have been selected. For example, a selection of two staples may result in automatic selection of location due to the stapling mechanism of the system 10. Additionally, the system 10 may contain constraints that require a minimum amount of information, either from user input or using automatic detection features, to enable the system 10 to provide the user interface mimic 20 in accurate form and to clearly show the options available to users, depending on the physical constraints of the digital printing device 12 and the at least one input document.

Figure 2:
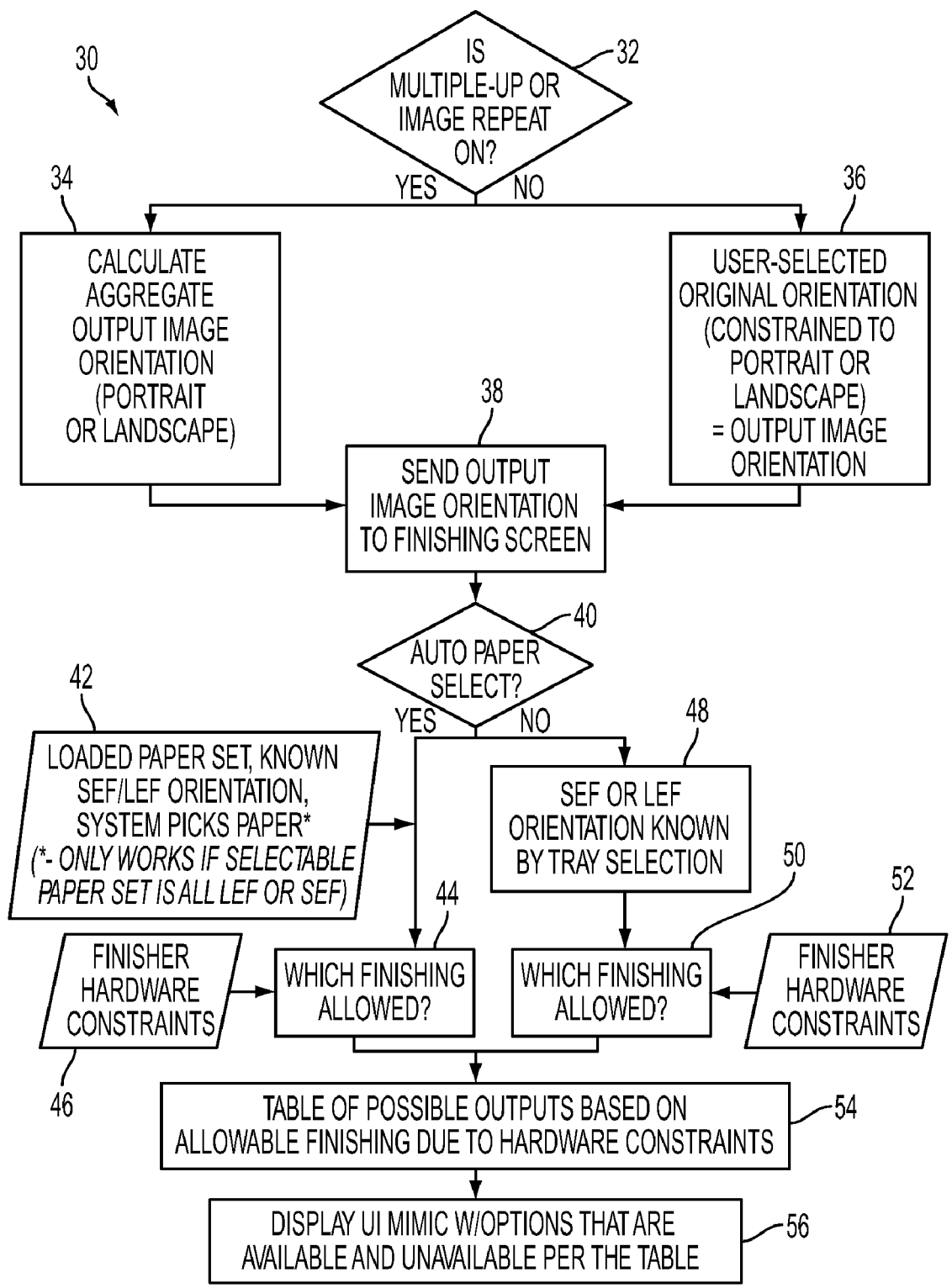
FIG. 2 illustrates a method for using user interface mimics to prepare an output document of a digital printing device.

FIG. 2 provides a non-limiting example of a method 30 for using the printing device 12 with the at least one user interface mimic 20 to prepare an output document with the output options 18. The method 30 includes a first step 32, which determines if multiple-up or image repeat is an output option 18 selected by the user. The multiple-up option arranges multiple distinct images on one page, allowing a user to print an output document with multiple copies of an image arranged on one page. For example, if the user wants two distinct images arranged on one page, the printing device 12 may be capable of scanning both images separately and arranging both images on one page, such that both images may be printed on one page. Image repeat is similar to multiple-up, except instead of arranging more than one distinct image on one page, the printing device 12 may be configured to arrange multiple copies of the same image on one page. For example, image repeat may be used if the user wants to print an output document with six copies of one image arranged on one page.

Figure 3:
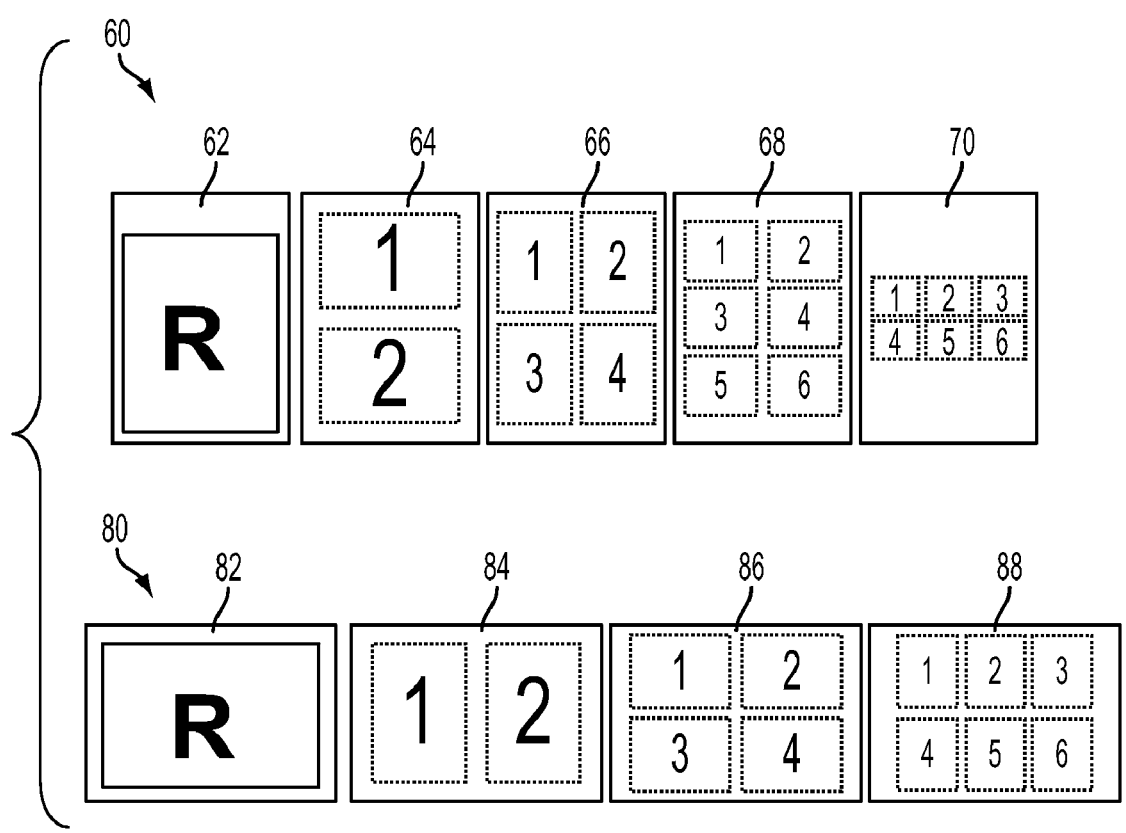
FIG. 3 illustrates an example of possible output documents when multiple-up or image repeat are selected.
Figure 4:
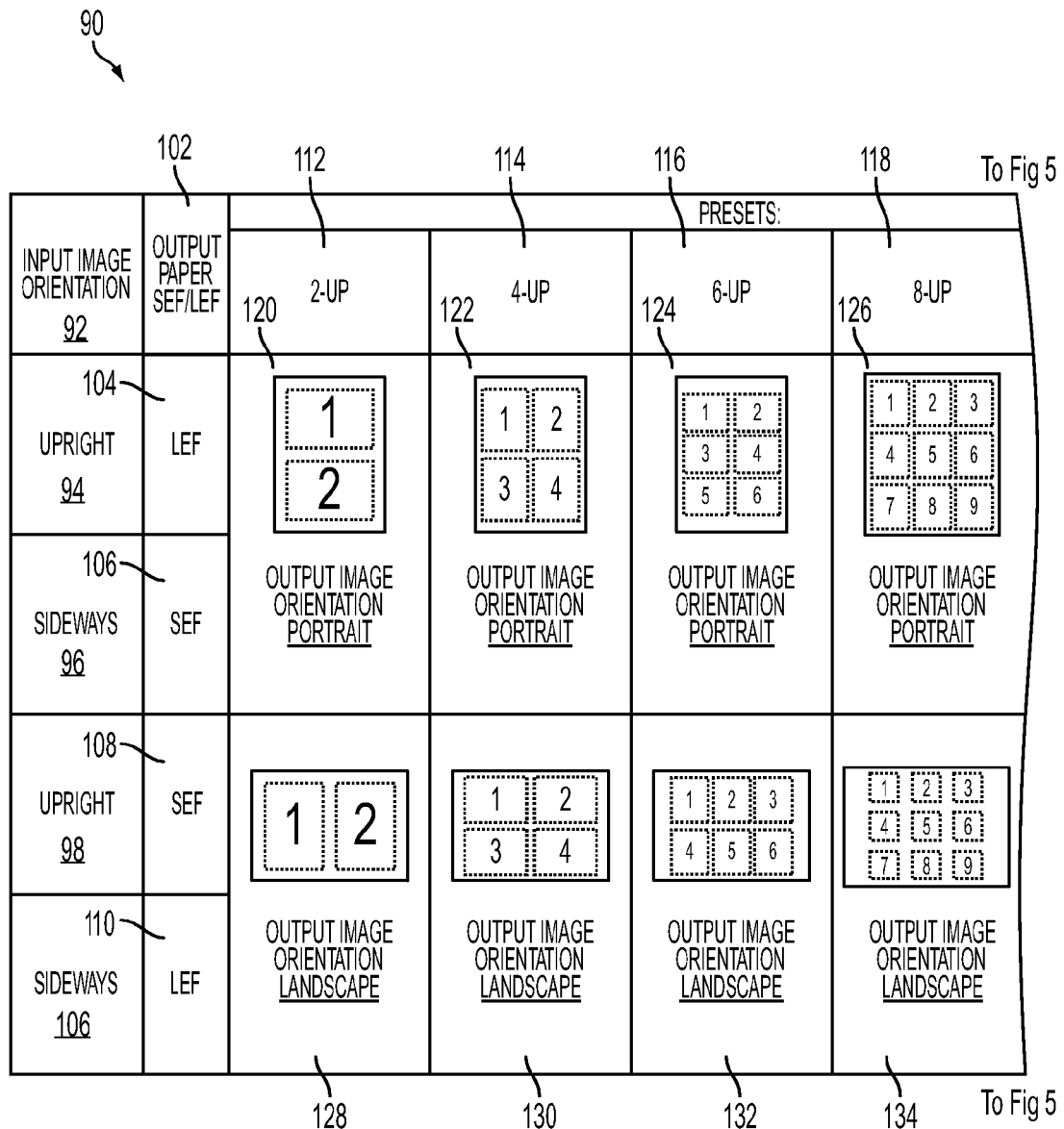
FIGS. 4-8 provide example tables for calculating the aggregate output image orientation.

FIG. 3 further provides a non-limiting example of output documents when the multiple-up or image repeat output options 18 are selected. Reference 60 shows examples of how original images with a portrait orientation 62 may be arranged with two images 64 on the output document, four images 66 on the output document, and six images 68, 70 on the output document. In contrast, reference 80 provides examples of how original images with a landscape orientation 82 may be arranged with two images 84 on the output document, four images 86 on the output document, and six images 88 on the output document.

When multiple-up or image repeat is selected, step 34 may calculate the possible output image orientations based on possible size and/or orientation of the output document. The size and/or orientation of the output document may be specified by the user (e.g., by input through the interface 14); through default settings; and/or through sensory placement of input documents. (FIGS. 3-8). Alternatively, the user interface 14 may provide different multiple-up or image repeat options for various document sizes and orientations. As will be appreciated by those skilled in the art, the system 10 may be configured to designate a preferred ranking of multiple-up or image repeat size and orientation, such that by selection by the user of a multiple-up or image repeat settings results in automatic selection of paper size and orientation. For example, a six image multiple-up setting may be selected, and an 8.5×11" paper size with a landscape orientation may be designated by the system 10. As discussed below, the automatic selection is presented to a user prior to printing. When multiple-up and image repeat are off, step 36 sets the user selected original orientation as the output image orientation. Then, in step 38, the output image orientation is sent to the finishing screen in step 38.

In step 40, the method 30 determines whether the "auto paper select" option is selected on the printing device 12. When the auto paper select option is selected, step 42 uses the printing device 12 to determine which loaded paper to use for the output document, depending on the original input document's orientation and whether the output document paper is loaded using short edge feed (SEF) or long edge feed (LEF). Note the auto paper select option may only be used if the orientation of the paper, SEF or LEF, in the paper trays is known to the printing device 12. When the auto paper select option is not selected, step 48 uses the paper tray selected to determine the paper orientation, SEF or LEF, for the output document.

Figure 9:
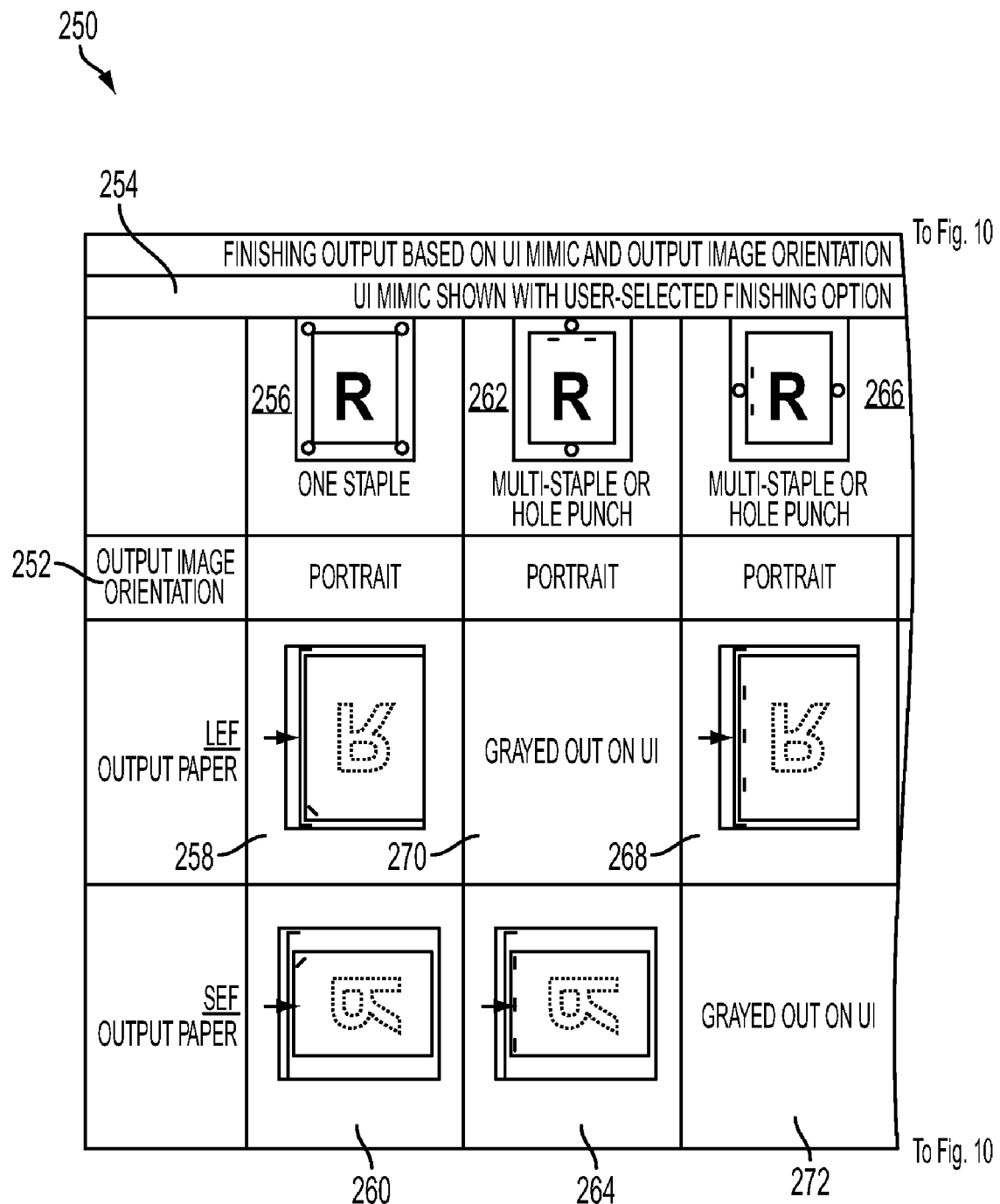
FIGS. 9-10 illustrate an example table of possible output documents based on the output document orientation and possible staple finishing options.
Figure 10:
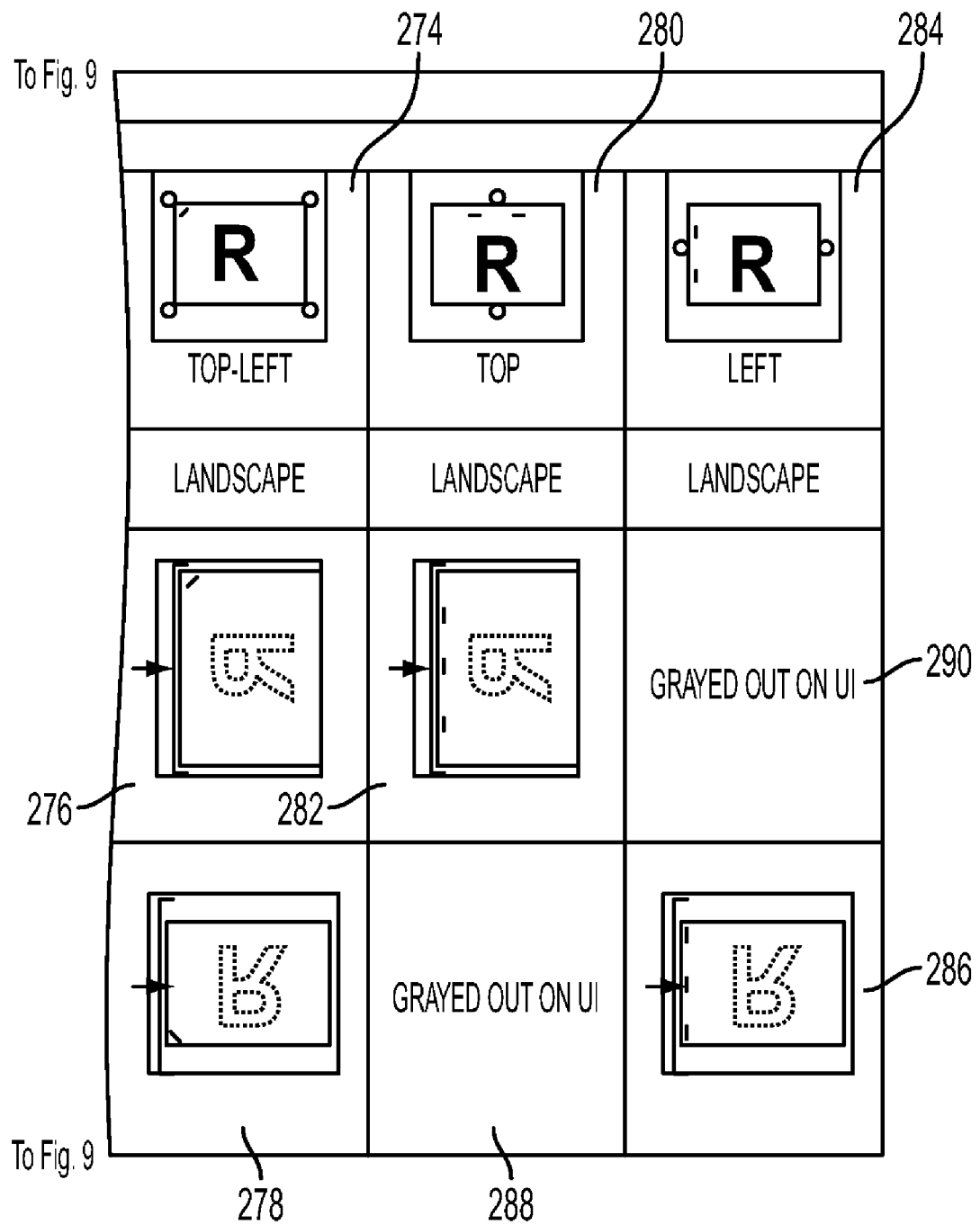

Once the printing device 12 determines the paper tray for the output document, the printing device 12, in steps 44 and 50 respectively, determines the finishing options allowed using the finisher hardware constraints in steps 46 and 52 respectively. Thereafter, in step 54, a table of possible outputs is used to determine allowable finishing options according to hardware constraints (FIGS. 9-10). Finally, step 56 provides a display device 16 that displays the user interface mimic 20 corresponding to the selected output option(s) 18. Step 56 may further display the finishing options that are available and unavailable (FIGS. 11-13), according to the table of possible outputs in step 54 (FIGS. 9-10).

The method 30 may further provide users with the ability to modify the user interface mimic 20 displayed by using the display device 16 to add and/or remove output options 18 from the user interface mimic 20. Both displaying the user interface mimic 20 and allowing modifications to be displayed using the user interface mimic 20, the printing of the output document becomes more predictable and users may be able to print the output document correctly and avoid multiple trial and error attempts.

With reference to FIGS. 4-8, an example of tables for calculating the aggregate output image orientation 34. In particular, the table 90 of FIGS. 4-5 can calculate the aggregate output image orientation 34 by determining the input image or original image orientation 92, which may be either upright 94, 98 or sideways 96, 100; how the output paper is fed 102, either LEF 104, 108 or SEF 106, 110; and the number of images on the output document and the orientation of the output document, such as 2-up 112 with portrait orientation 120, 4-up 114 with portrait orientation 122, 6-up 116 with portrait orientation 124, 9-up 118 with portrait orientation 126, 2-up 112 with landscape orientation, 4-up 114 with landscape orientation 130, 6-up 116 with landscape orientation 132, and 9-up 118 with landscape orientation 134.

Figure 5:
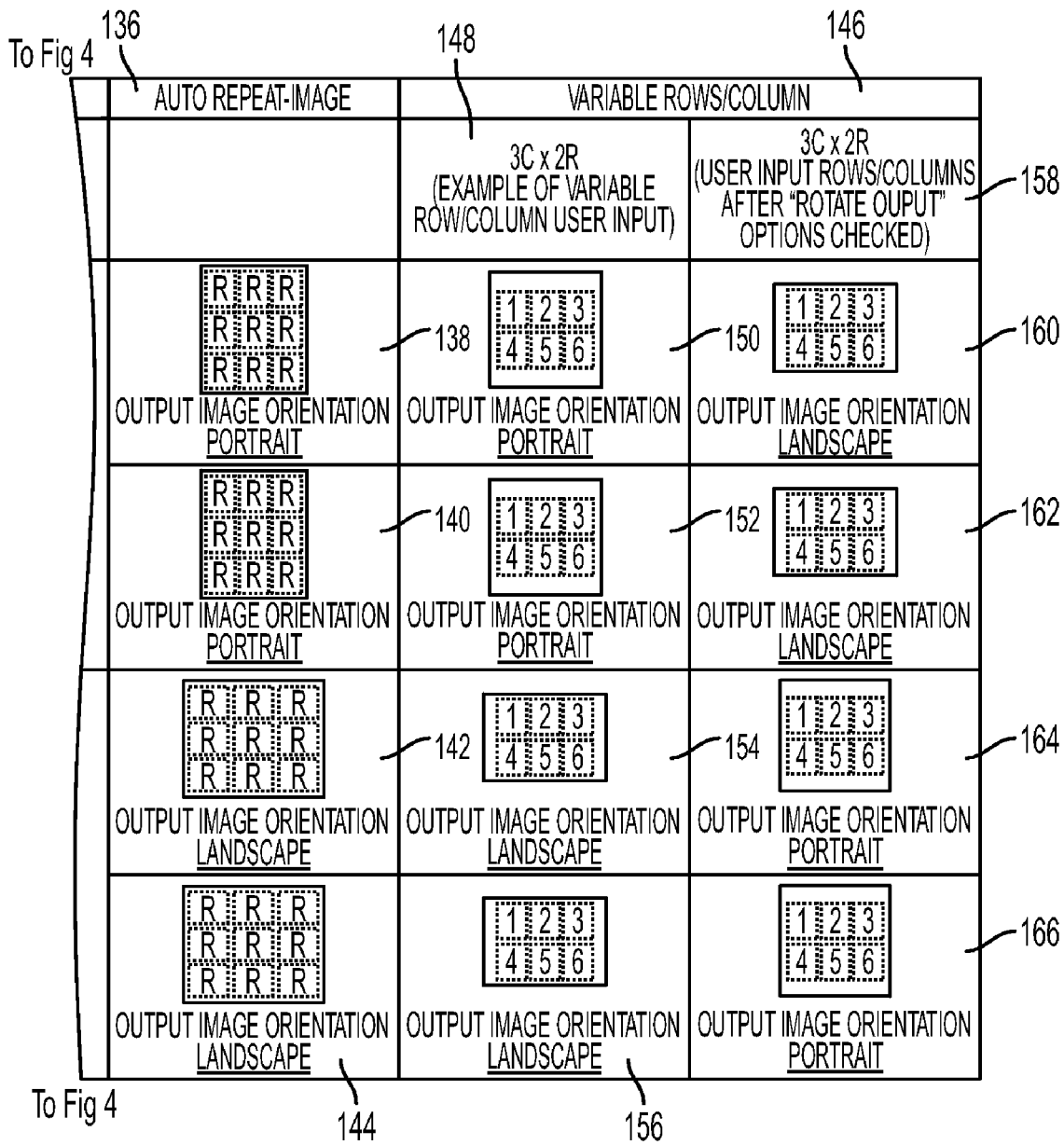

The table 90 in FIG. 5 further provides the output image orientation for the output option of image repeat 136 and provides examples of both portrait 138, 140 and landscape 142, 144 output document orientations depending on the original image orientation 92. The table 90 also provides an example of how users may change the row/column orientation of the images 146. For example, a three columns by two rows grouping of images 148 may be printed on an output document with a portrait orientation 150, 152 or a landscape orientation 154, 156. Users may also choose to select a "Rotate Output" option 158 that will change the orientation of the output document from portrait 150, 152 to landscape 160, 162 or from landscape 154, 156 to portrait 164, 166.

Figure 6:
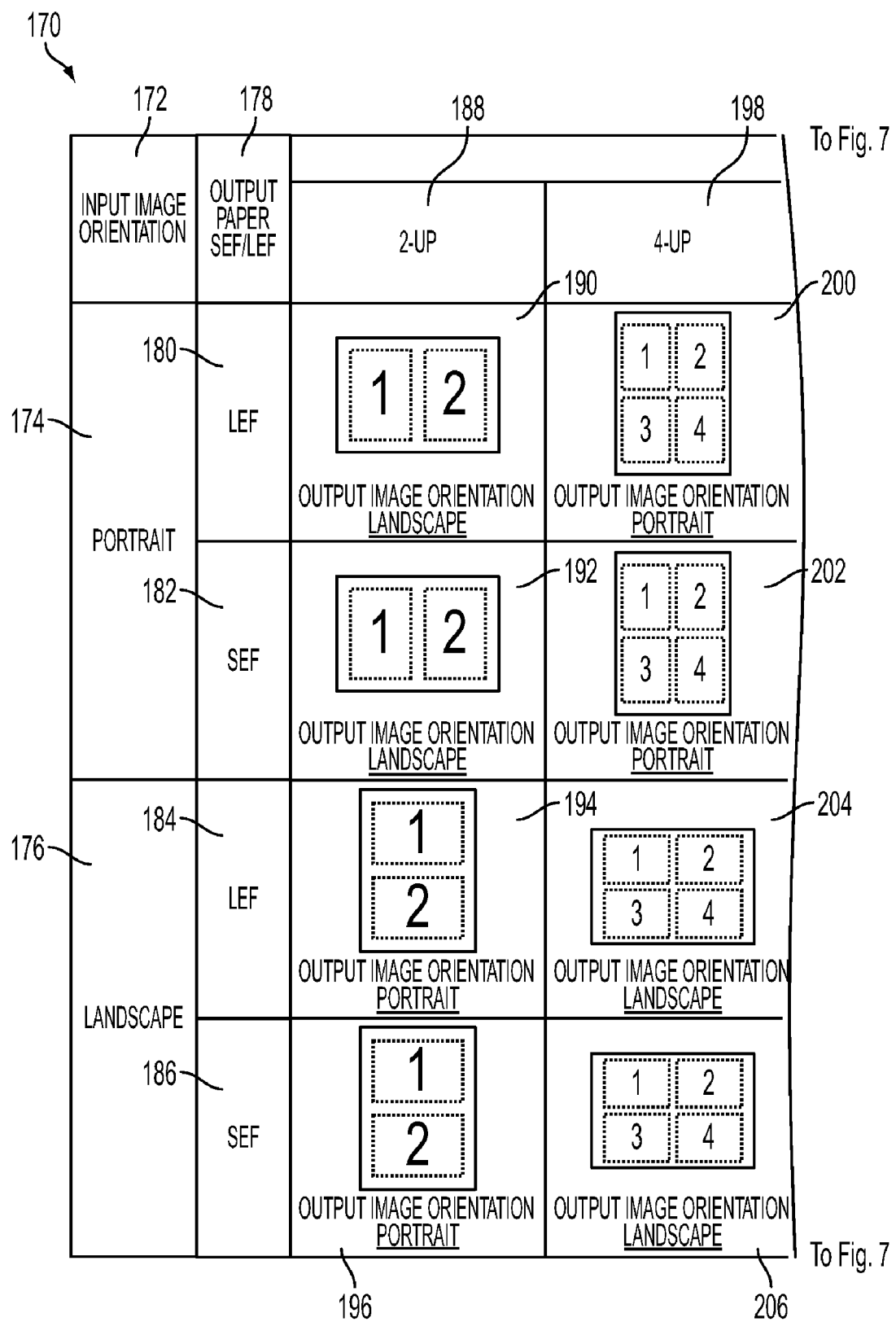
Figure 7:
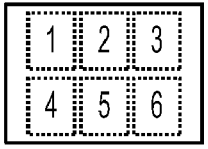
Figure 8:
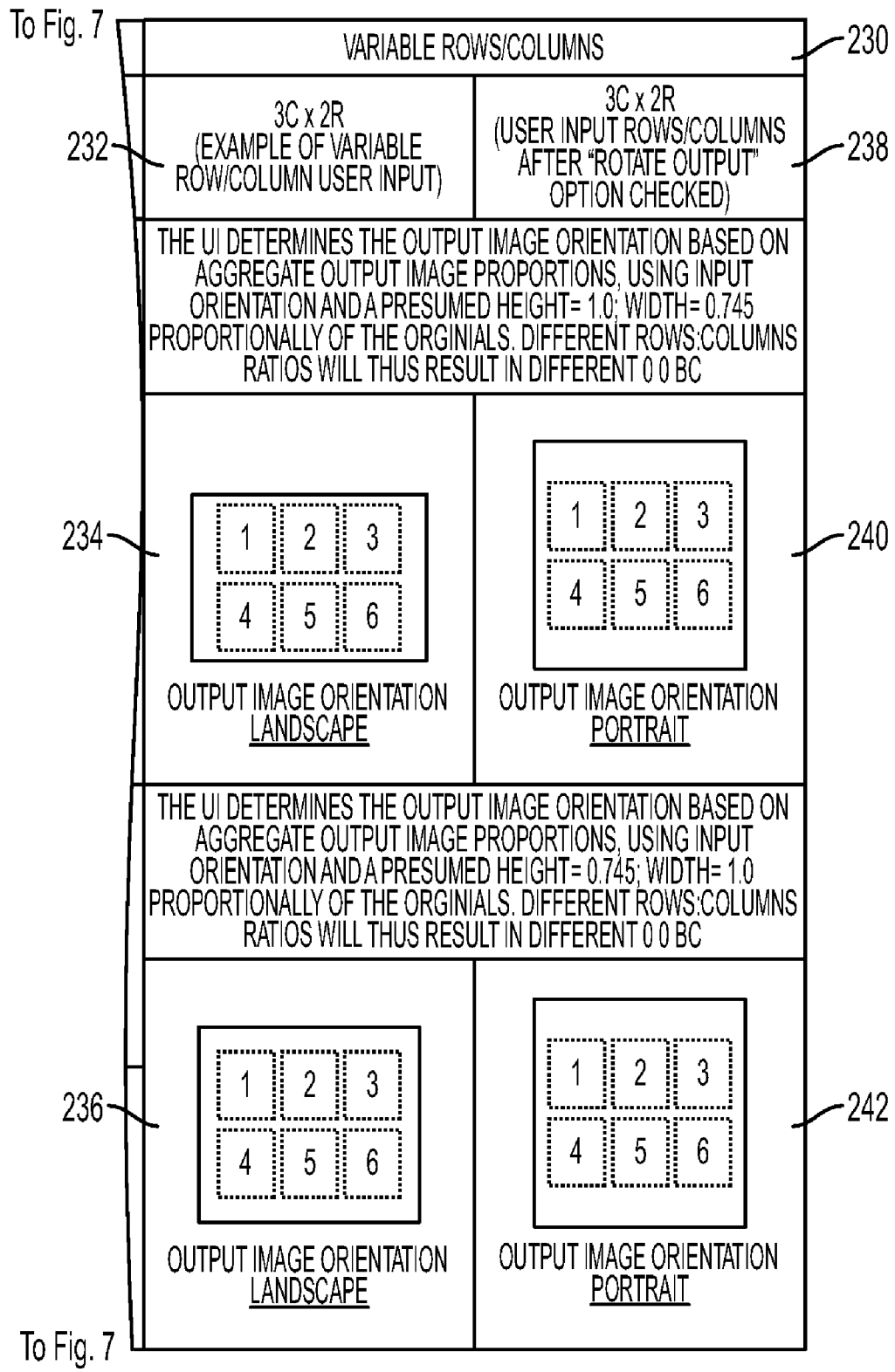

With reference to FIGS. 6-8, an example of a table 170 is provided. The table 170 is similar to table 90, but is configured to be used with a printing device 12 that classifies the input image or original image orientation 172 as either portrait 174 or landscape 176. The output document orientation 178 for each of the original image orientations may be either LEF 180, 184 or SEF 182, 186 respectively. The table 170 further provides example output document orientations depending on the number of images. For example, when the original image orientation 172 is portrait 174, the output document orientation is landscape 190, 192, 210, 212 for 2-up 188 and 6-up 208 and portrait 200, 202, 220, 222 for 4-up 198 and 9-up 218. To the contrary, when the original image orientation 172 is landscape 176, the output document orientation is portrait 194, 196, 214, 216 for 2-up 188 and 6-up 208 and landscape 204, 206, 224, 226 for 4-up 198.

The table 170 also provides an example of how users may change the row/column orientation of the images 230. For example, a three columns by two rows grouping of images 232 may be printed from an original document with a portrait orientation 174 on an output document with a landscape orientation 234 and an original document with a landscape orientation 176 may be printed as an output document with a landscape orientation 236, which may be determined by the printing device's 12 table 170 for calculating aggregate output document orientation and row/column settings as selected by users. Users may also choose to select a "Rotate Output" option 238 that will change the above orientation of the output document from landscape 234, 236 to portrait 240, 242.

FIGS. 9-10 provide an example of a table 250 of possible locations of various finishing output options 18. The printing device 12 will automatically select the location for each finishing output option 18 depending on the output document orientation 252 and the finishing 254 selected. For example, when the output document orientation 252 is portrait, the output options 18 shown on the display device 16 as available include one staple with output paper loaded LEF 258 or SEF 260, multiple-staple or hole punch with output paper loaded SEF 264, and multi-staple or hole punch 266 with output paper loaded LEF 268; and the output options 18 shown as unavailable or grayed out on a display device 16 include multiple-staple or hole punch 262 with output paper loaded LEF 270, and multi-staple or hole punch 266 with output paper loaded SEF 272. For example, when the output document orientation 252 is landscape, the output options 18 shown on the display device 16 as available include top-left staple 274 with output paper loaded LEF 276 or SEF 278, multiple-staple or hole punch on top 280 with output paper loaded LEF 282, and multi-staple or hole punch on left 284 with output paper loaded SEF 286; and the output options 18 shown as unavailable or grayed out on a display device 16 include multiple-staple or hole punch on top 280 with output paper loaded SEF 288, and multi-staple or hole punch on left 284 with output paper loaded LEF 290.

Figure 11:
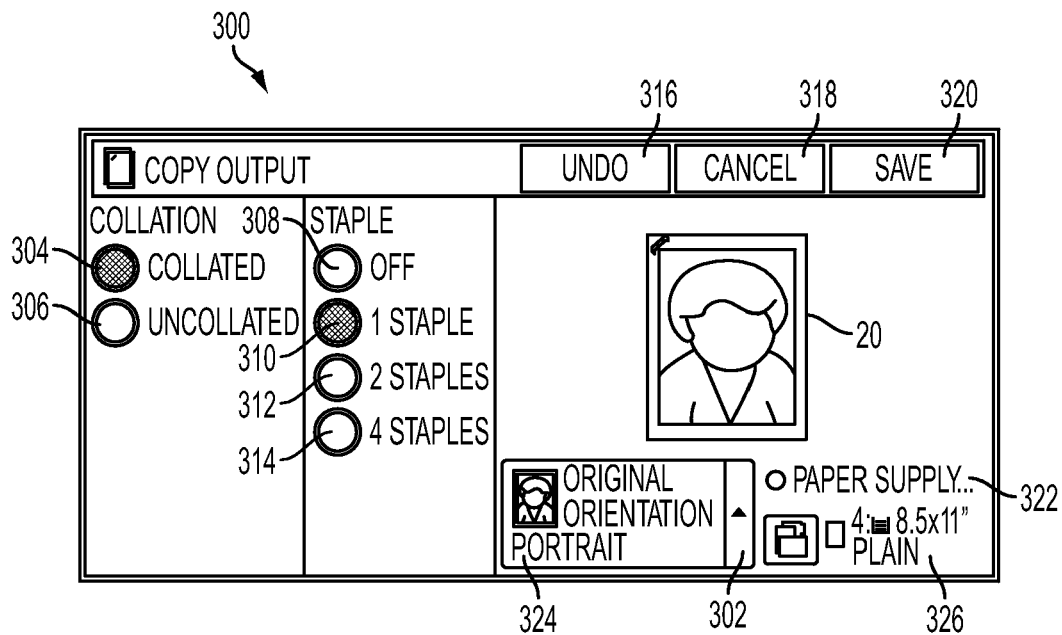
FIGS. 11-13 illustrate examples of user interface mimics with available finishing options.
Figure 12:
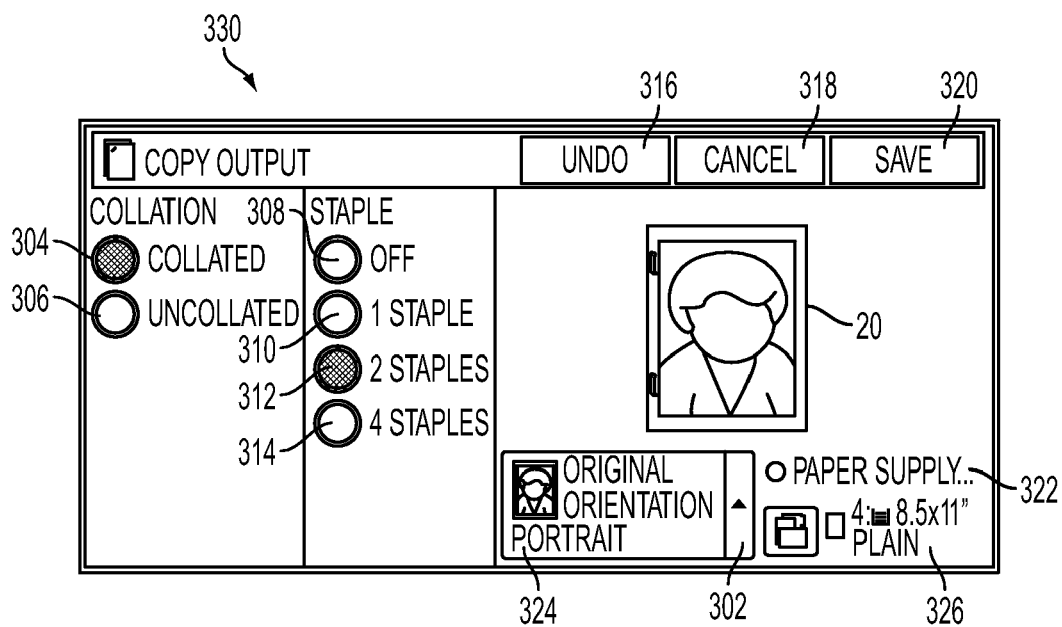
Figure 13:
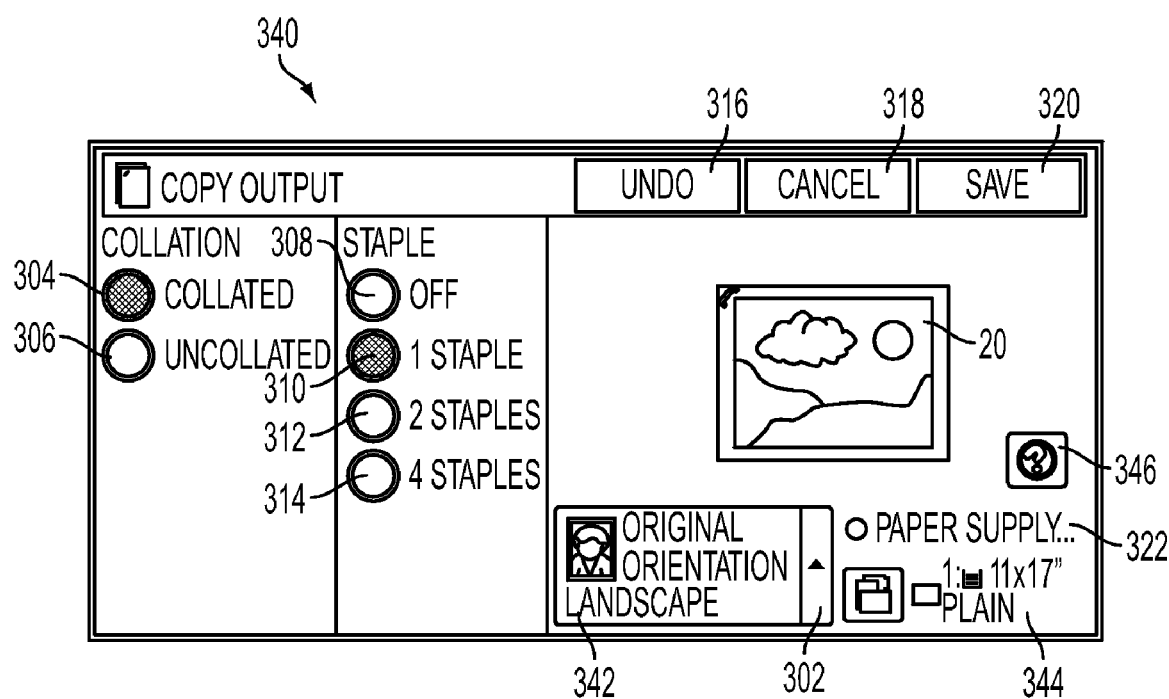

FIGS. 11-13 show examples of user interface mimics 20 capable of being modified using the user interface 14 and displayed on the display device 16. Users may use the user interface 14 and user interface mimics 20 to predict location of output options 18 on the output document without printing multiple trial and error output documents. The user interface 14 displays the location of the output options 18 once the landscape or portrait orientation 302 of the output document is known, allowing a user to select the desired finishing output options 18, such as a staple, on the first attempt. Examples of output options 18 available for selection by users include collated 304 or uncollated 306; no staples 308, one staple 310, two staples 312, or four staples 314. The user interface 14 may also provide users with the ability to undo 316, cancel 318, or save 320 output options 18 and an option to change the paper supply 322.

For example, FIG. 11 (300) provides a user interface mimic 20 with the output document having a portrait orientation 324, one staple 310, collated 304, and printed on 8.5×11" plain paper 326. After selecting the output options 18, users may save 320 the output options 18 and print the output document. When users choose to save 320 the output options 18, the processor 22 receives the information and tells the printing device 12 to print the output document. Conversely, users may select cancel 318. The selection of cancel will cause the processor 22 to clear the user interface mimic 20 and allow users to start over. FIG. 12 (330) provides another example of a user interface mimic 20 with the output document having a portrait 324 orientation, two staples 312, collated 304, and printed on 8.5×11" plain paper 326.

FIGS. 11-12 provide an example of how the user interface mimic 20 is updated when users change output options 18. For example, based on requested modifications after reviewing the user interface mimic 20 of FIG. 11, FIG. 12 may show the same user interface mimic 20 as FIG. 11, except FIG. 12 contains two staples 312 instead of the one staple 310 provided in the user interface mimic 20 of FIG. 11. If a user chooses to revert to the previous selection of output options 18, such as changing the number of staples in FIG. 12 back to one staple 310, as shown in the FIG. 11, users may select undo 316. The selection of undo 316 will cause the processor 22 to change the output options 18 back to previous settings, as shown in FIG. 11.

Yet another example of a user interface mimic 20 is provided in FIG. 13 (340) for an output document with a landscape orientation 342 with one staple 310, collated 304, and printed on 11×17" plain paper 344. FIG. 13 further provides an example of a help feature represented by a question mark image 346. The help feature provides users with instructions for modifying the output options 18 prior to printing the output document.

The printing device 12 may also be configured to provide default settings that may be further configured by users. Examples of default settings include, but are not limited to, automatic selection of paper based on information known to the printing device 12 if no paper is selected, automatic printing of an output document if the printing device 12 is idle for a predetermined amount of time, and automatic clearing of the output options 18 the printing device 12 is idle for a predetermined amount of time.

It will be appreciated that various of the above-disclosed and other features and functions, or alternative thereof, may be desirably combined into many other different systems or applications. Various presently unforeseen or unanticipated alternatives, modifications, variations, or improvements therein may be subsequently made by those skilled in the art which are also intended to be encompassed by the following claims. In addition, the claims can encompass embodiments in hardware, software, or a combination thereof.

What is claimed is:

1. A user interface system for preparing a multiple-up or image repeat output document of a digital printing device comprising:
   a user interface;
   a set of finishing options, wherein said user interface enables selection of at least one finishing option from said set of finishing options;
   a processor configured for:
      determining whether at least one of multiple-up or image repeat layout is selected for the print job,
      based on the determination, if multiple-up or image repeat layout is selected then
      determining output image orientation, based on one or more input documents, to generate one or more multiple-up or image repeat layouts,
      otherwise, determining output image orientation based on a user-selected original orientation;
      determining whether automatic paper selection is enabled,
      based on the determination, if automatic paper selection is enabled then
      determining orientation of paper available to the printing device, the paper orientation being based on short edge feed or long edge feed, and automatically selecting the paper having the orientation matching the determined output image orientation for printing,
      otherwise, prompting for user selection of a tray containing paper in the determined output image orientation;
      determining said finishing options available for printing the multiple-up or image repeat output document based on the output image orientation based on the orientation of the available paper, and based on constraints of the set of the finishing options;
      creating a table of possible outputs based on the determined finishing options; and,
   a display device operatively connected to said processor and configured to display at least one user interface mimic graphically representing said finishing options available for printing the multiple-up or image repeat output document based on the output image orientation and based on the orientation of the available paper.

2. The system of claim 1, wherein the output image orientation is calculated using an aggregate output image orientation based on a total number of said input documents combined to create the multiple-up or image repeat output document and an orientation of each of said input documents.

3. The system of claim 1, wherein said finishing options includes one or more of the following selected from the group consisting of stapling, hole punching, folding, annotations, page numbers, dates, watermarks, edge erase, and image shift.

4. The system of claim 3, wherein said display device is configured to display both available and unavailable finishing options, with unavailable finishing options designated as unavailable for selection by users.

* * * * *